(12) United States Patent
Sordelet et al.

(10) Patent No.: US 9,737,964 B2
(45) Date of Patent: Aug. 22, 2017

(54) STEAM OXIDATION OF THERMAL SPRAY SUBSTRATE

(71) Applicant: Caterpillar Inc., Peoria, IL (US)

(72) Inventors: Daniel Sordelet, Peoria, IL (US); Thomas Clements, Peoria, IL (US); Robert Sharp, Corinth, MS (US)

(73) Assignee: Caterpillar Inc., Peoria, IL (US)

(*) Notice: Subject to any disclaimer, the term of this patent is extended or adjusted under 35 U.S.C. 154(b) by 126 days.

(21) Appl. No.: 14/714,712

(22) Filed: May 18, 2015

(65) Prior Publication Data

US 2016/0339545 A1 Nov. 24, 2016

(51) Int. Cl.

| | |
|---|---|
| *B23P 6/00* | (2006.01) |
| *C23C 4/12* | (2016.01) |
| *C23C 4/06* | (2016.01) |
| *C23C 4/02* | (2006.01) |
| *C23C 8/18* | (2006.01) |
| *C23C 8/80* | (2006.01) |
| *F01D 5/00* | (2006.01) |
| *F01D 5/28* | (2006.01) |

(52) U.S. Cl.
CPC ........ *B23P 6/00* (2013.01); *C23C 4/02* (2013.01); *C23C 8/18* (2013.01); *C23C 8/80* (2013.01); *F01D 5/005* (2013.01); *F01D 5/288* (2013.01); *F05D 2220/40* (2013.01)

(58) Field of Classification Search
CPC ... B23P 6/00; C23C 4/02; C23C 4/122; C23C 4/06; C23C 4/127; C23C 4/125; C23C 4/128; C23C 4/124
See application file for complete search history.

(56) References Cited

U.S. PATENT DOCUMENTS

| | | | |
|---|---|---|---|
| 2,825,668 A * | 3/1958 | Howes | ............. H01L 21/00 148/276 |
| 6,087,019 A * | 7/2000 | Isobe | ............. C21D 8/0278 428/469 |
| 6,129,994 A | 10/2000 | Harada et al. | |
| 7,323,247 B2 | 1/2008 | Raybould et al. | |
| 7,520,940 B2 | 4/2009 | Yoon et al. | |
| 2012/0308733 A1 | 12/2012 | Von Niessen et al. | |
| 2012/0308772 A1 | 12/2012 | Haruyama et al. | |
| 2016/0281538 A1 * | 9/2016 | Keltner | ............. F01D 25/24 |

FOREIGN PATENT DOCUMENTS

| | | |
|---|---|---|
| EP | 0546756 A2 | 6/1993 |
| JP | 2007023332 A | 2/2007 |

* cited by examiner

*Primary Examiner* — John C Hong
(74) *Attorney, Agent, or Firm* — Baker Hostetler

(57) ABSTRACT

A process of remanufacturing a component such as an attachment flange used in turbochargers is provided and includes using a steam oxidation process to form an adhesion layer on top of a sealing surface of the component. The adhesion layer is an oxidation layer that a thermal metal spray coating can be applied on top of in order to prevent spalling that can occur at high heat. Once the process is completed, the component can be inspected to ensure that it meets or exceeds the manufacturer's original specifications.

20 Claims, 4 Drawing Sheets

STEAM OXIDATION OF THERMAL SPRAY SUBSTRATE

TECHNICAL FIELD

The disclosure relates to a steam oxidation process, and more specifically, relating to using steam oxidation on a thermal sprayed substrate or component.

BACKGROUND

Combustion engines such as diesel engines, gasoline engines, and gaseous fuel-powered engines are supplied with a mixture of air and fuel for combustion within the engine that generates a mechanical power output. In order to maximize the power output generated by this combustion process, the engine is often equipped with a divided exhaust manifold in fluid communication with a turbocharged air induction system.

The divided exhaust manifold increases engine power by helping to preserve exhaust pulse energy generated by the engine's combustion chambers. Preserving the exhaust pulse energy improves the turbocharger's operation, which results in a more efficient use of fuel. In addition, the turbocharged air induction system increases engine power by forcing more air into the combustion chambers than would otherwise be possible. This increased amount of air allows for enhanced fueling that further increases the power output generated by the engine.

However, during use and due to high operating temperatures, components of the turbocharger wear down and need to be replaced. Some of these components can include attachment flanges on the turbochargers, which can be damaged during use and thus, they need to be replaced or remanufactured. Coating systems with acceptable oxidation resistance (e.g. Fe-22Cr-6Al) are readily available and are effective to applications of around 600° C. However, at higher temperatures, such as 800° C. and during thermal cycling, components such as attachment flanges have failed due to separation of the Fe-22Cr-6Al coating at the substrate or component surface. The separation occurs due to oxidation of the base material side of the substrate-coating interface surface and during thermal cycling, as the poorly adhered oxide on the cast iron turbocharger's surface tends to spall, leading to separation of the thermal spray coating. During the thermal spray coating process, the coatings are not completely dense, and the opportunity for air or gas to seep into the coating exists and difficult to eliminate. Even using a thermal spray coating with higher oxidation resistance will not necessarily work because the same propensity for oxidation of the cast iron surface at the coating surface still exists.

U.S. Patent Publication No. 2012/030873 discloses a that to manufacture a thermal barrier coating structure on a substrate surface, a working chamber having a plasma torch is provided, a plasma jet is generated in that a plasma gas is conducted through the plasma torch and is heated therein by means of electric gas discharge, electromagnetic induction or microwaves, and the plasma jet is directed to the surface of a substrate introduced into the working chamber. To manufacture the thermal barrier coating, a voltage is additionally applied between the plasma torch and the substrate to generate an arc between the plasma torch and the substrate and the substrate surface is cleaned by means of the light arc, wherein the substrate remains in the working chamber after the arc cleaning and an oxide layer is generated on the cleaned substrate surface and a thermal barrier coating is applied by means of a plasma spray process. However, this process still does not reduce or eliminate the potential separation of the coating structure due to oxidation at the surface of the substrate.

Thus, there is a need for an improved process that reduces or prevents oxidation of the substrate surface and allows the components such as attachment flanges of turbochargers to be remanufactured.

SUMMARY

In one aspect, a method of remanufacturing a component of a turbocharger that includes cleaning the component for a first time, machining the component for a first time, applying a steam oxidation process in a furnace to form an iron oxide layer on a sealing surface of the component, applying a thermal metal spray coating on the component, and machining the component for a second time.

In another aspect, a method of remanufacturing a component of a turbocharger is provided and can include cleaning the component for a first time, machining the component for a first time to create a tortuous surface on a sealing surface of the component, applying a steam oxidation process in a furnace to form an iron oxide layer on the sealing surface of the component, applying a thermal metal spray coating on top of the sealing surface of the component, machining the component for a second time, and cleaning the component for a second time.

DETAILED DESCRIPTION

Figure 1:
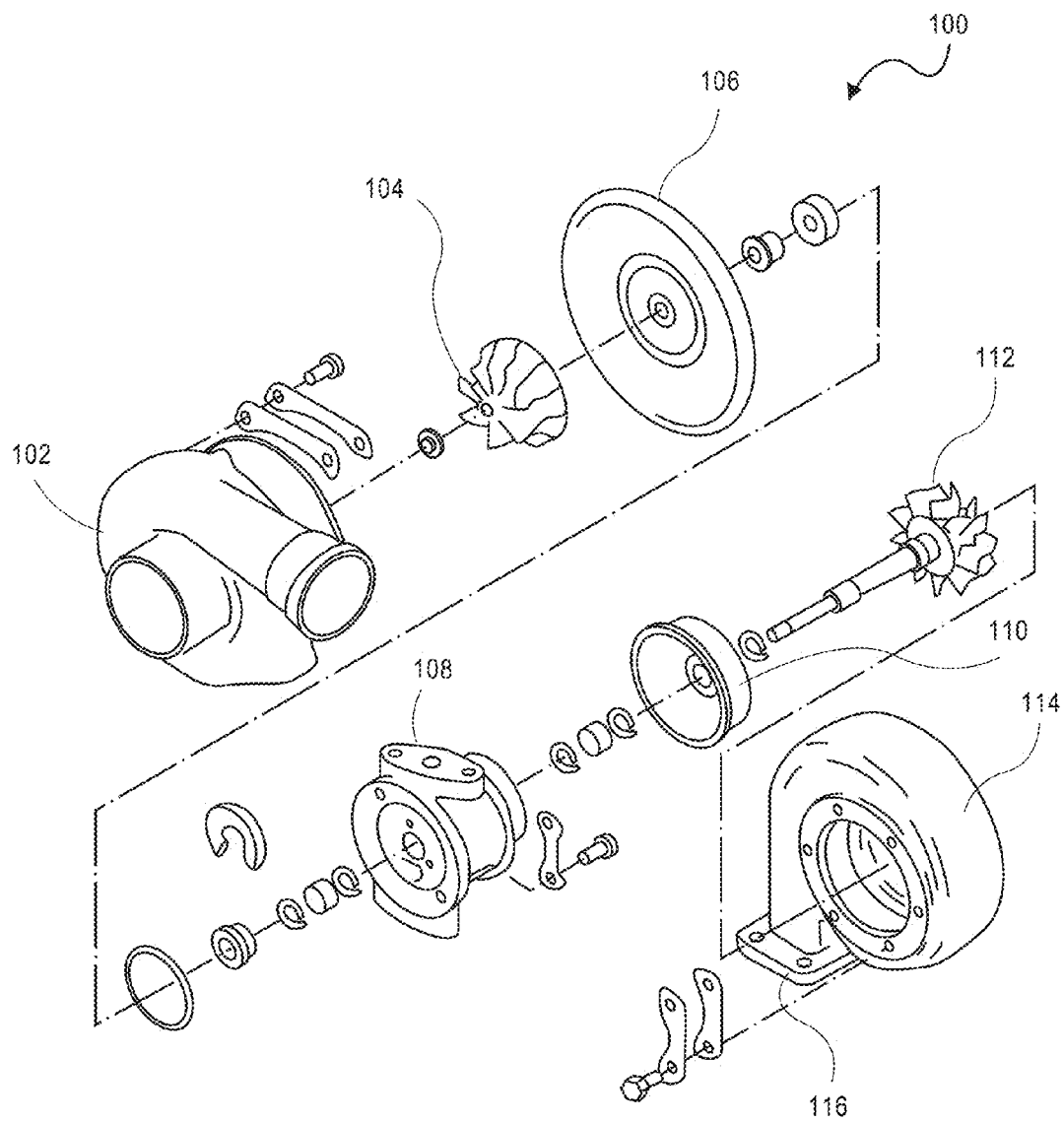
FIG. 1 illustrates turbochargers having an attachment flange according to an aspect of the disclosure.

FIG. 1 illustrates turbochargers 100 having an attachment flange 116 according to an aspect of the disclosure. The turbochargers 100 main components include a compressor housing 102, a compressor wheel 104, a back plate 106, a central housing 108, a wheel shroud 110, a turbine wheel 112 and a turbine housing 114 having the attachment flange 116. The compressor housing 102 is typically made from aluminum and contains a volute that collects compressed air from the compressor wheel 104 and directs it to the engine. The compressor wheel 104 can function to pump air into the engine and is usually made of aluminum, either cast or forged milled billet. In operation, the compressor wheel 104 can pull air from a filter assembly (not shown) and then spins it at a high rate of speed into the compressor housing volute to produce pressure to feed the engine.

The back plate 106 can support the compressor housing 102 by being bolted thereto. The central housing 108 houses ball bearings and other components and the wheel shroud 110 houses the turbine wheel 112. The turbine wheel 112 converts exhaust energy (heat and pressure) into shaft power to drive the compressor (not shown) via the compressor wheel 104. Turbine wheels are usually made of Inconel or other high temperature alloys to allow them to perform in a temperature environment that regularly exceeds 1200° F.

Because the turbine wheel 112 and the compressor wheel 104 are connected via the shaft, they both rotate at substantially the same speed. The turbine housing 114 collects exhaust gases from the engine and directs it to the turbine wheel 112. The turbine housing 114 can be made from cast iron or steel and includes the attachment flange 116 that attaches to a portion of the engine. However, during use and thermal cycling, a sealing surface 118 (See FIG. 2) of the attachment flange 116 can deteriorate due to conditions in the turbochargers or due to oxidation of the thermal spray coating on the sealing surface 118 requiring replacement or remanufacturing.

Figure 2:
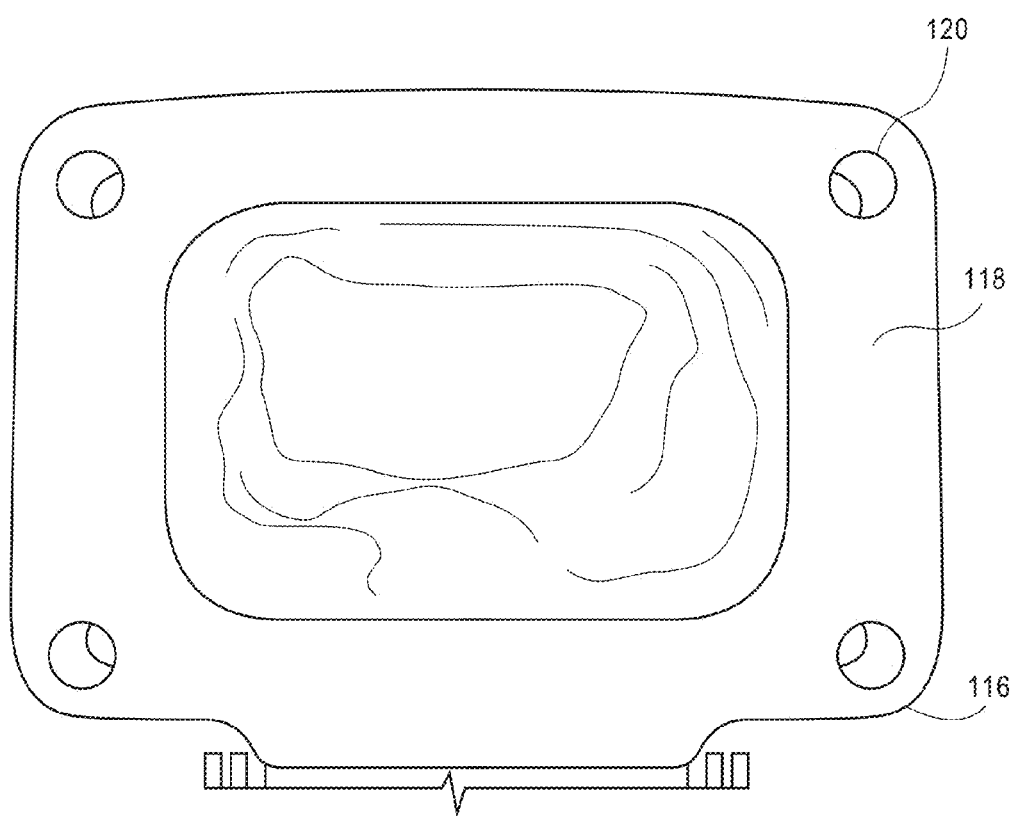
FIG. 2 illustrates a front view of an attachment flange according to an aspect of the disclosure.

FIG. 2 illustrates a front view of an attachment flange 116 according to an aspect of the disclosure. The attachment flange 116 includes the sealing surface 118, which can be coated with a thermal coating spray. The attachment flange 116 also includes bolt receiving holes 120 that received bolts (not shown) to couple the turbocharger to the engine.

A method of remanufacturing the sealing surface 118 is discussed below (FIG. 4) and includes using a controlled oxidation coating such as an steam oxidation process to provide a stable surface onto which a thermal metal spray can adhere to in order add a wear resistant material to the sealing surface. The steam oxidation process includes subjecting a component to a high temperature in a furnace for a predetermined period of time, then subjecting the component to steam that is introduced into the furnace and then the temperature can be raised for a predetermined amount of time and then reduced for a period of time.

Figure 3:
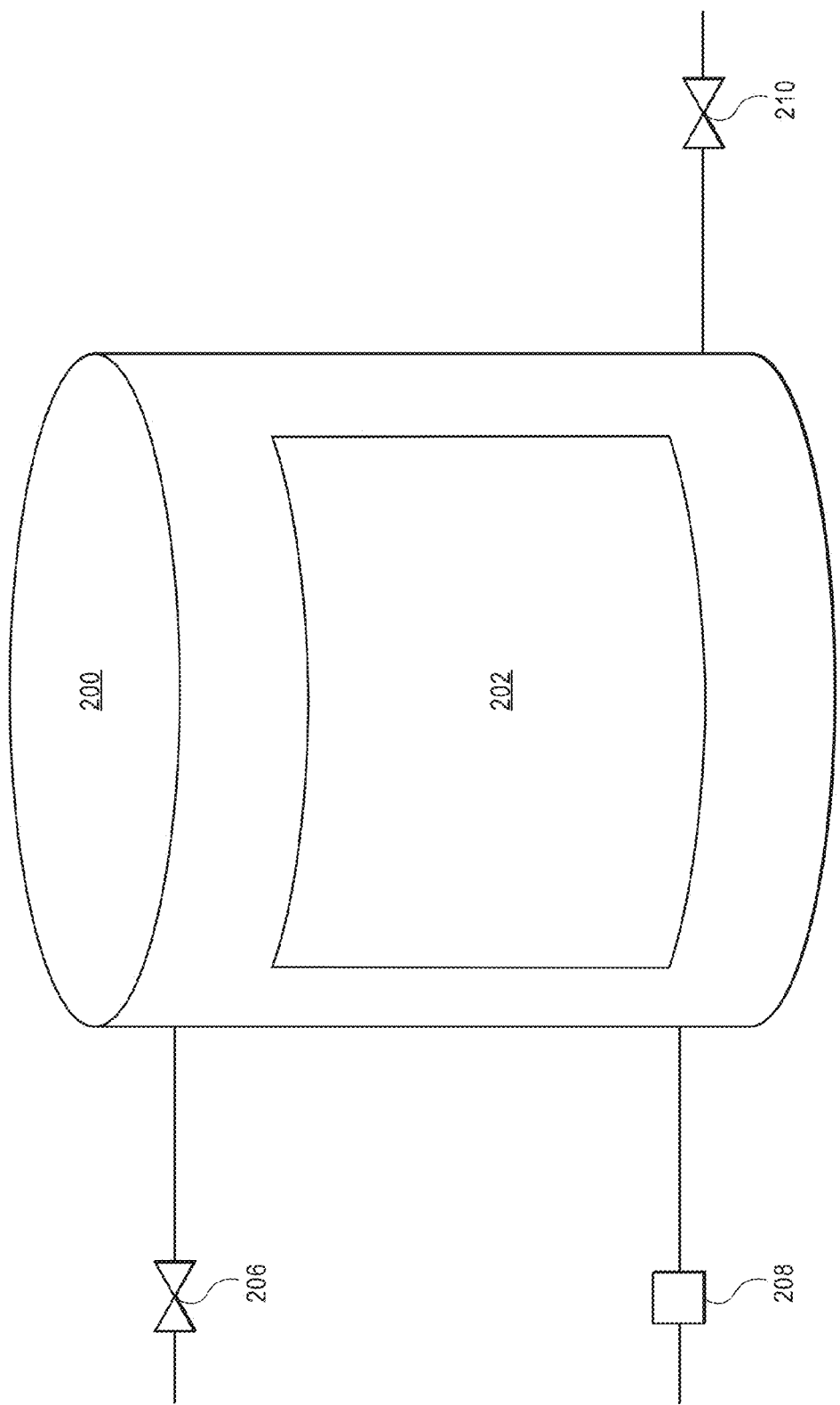
FIG. 3 illustrates a schematic diagram of an exemplary furnace for use in a steam oxidation process according to an aspect of the disclosure.

FIG. 3 illustrates a schematic diagram of an exemplary furnace 200 for use in a steam oxidation process according to an aspect of the disclosure. As shown, furnace 200 may include a temperature controller 208, a steam supply valve 206 connected to a source of steam (not shown), an exhaust valve 210, a furnace chamber 202, and one or more heating elements (not shown).

In an aspect of the disclosure, a cast component such as an attachment flange 116 may be placed in furnace chamber 202, and the temperature controller 208 may be used to create a desired time-temperature profile within furnace chamber 202. The temperature controller 208 may be manually controlled or may be automated such that a computer or other controller can adjust the temperature controller 208 to match a predetermined or programmed time-temperature profile in furnace chamber 202.

Steam supply valve 206 may be adjusted to control an amount of steam admitted to furnace chamber 202. During the disclosed steam oxidation process, steam supply valve 206 may be placed in a fully open position, a fully closed position, or at any partially open/closed position. Further, like temperature controller 208, steam supply valve 206 may be adjusted either manually or automatically (e.g., using a controller and one or more actuators) to provide a desired steam versus time profile in furnace chamber 202.

Similarly, the exhaust valve 210 may be adjusted to further control the amount of steam in furnace chamber 202 for any given period of time. For example, in a closed position, exhaust valve 210 minimizes or, ideally, prevents the flow of steam out of furnace chamber 202. In a partially to fully open state, exhaust valve 210 may be used to control the flow rate of steam through furnace chamber 202. In one embodiment, exhaust valve 210 may be manually or automatically adjusted separately or in tandem with steam supply valve 206 to provide the desired steam flow rate through furnace chamber 202. In this manner, the steam flow rate may be regulated anywhere between zero flow and a maximum flow rate. In certain applications, the steam flow rate may be controlled to vary according to a predetermined temperature-time-flow rate profile.

The disclosed steam oxidation process may be used with any suitable metal component, such as for example, cast iron, aluminum, antimony, beryllium, bismuth, brass, bronze, carbon steel, chromium, cobalt, copper, copper alloy, copper infiltrated steel, copper steel, copper infiltrated iron, gold, iron, iron-copper-steel, iron-nickel-steel, low alloy steel, magnesium, manganese, molybdenum, nickel, nickel silver, nickel steel, palladium, platinum, silver, sinter hardened steel, stainless steel, steel, tantalum, tin, titanium, tungsten, tungsten carbide, and any suitable alloys of these materials. The process may also be suitable for application on many ferrous alloys that have also received a ferritic nitrocarburizing heat treatment process.

In the case of ferrous metal parts, steam oxidation according to the disclosed process may form a layer of iron oxide according to the following chemical reaction:

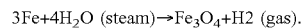

$$3Fe + 4H_2O \text{ (steam)} \rightarrow Fe_3O_4 + H2 \text{ (gas)}.$$

Thus, through this reaction, the oxide layer formed on a ferrous powder metal part may include iron oxide ($Fe_3O_4$). This iron oxide layer forms a protective or "sealed" layer over the cast iron component, such as the attachment flange 116. This iron oxide layer prevents oxidation of the cast iron surface, allowing the thermal spray coating that is applied thereon to withstand high temperature operations and thermal cycling conditions.

The disclosed steam oxidation process may include heating a cast iron component in a predetermined manner and exposing the cast iron component to steam. The component may be exposed to the steam while or after the component is heated for predetermined periods of time. In one aspect, the steam oxidation process may include placing one or more cast iron component into furnace chamber 202 of furnace 200. The temperature in furnace chamber 202 may be raised to a first temperature and maintained for a first predetermined amount of time. The first temperature may be within a range of about 350° C. to about 390° C. In one exemplary aspect, the first temperature may be about 360° C. The first predetermined amount of time may be between about 1 to 2 hours. In another exemplary embodiment, the first predetermined amount of time may be about 1.5 hours.

Next, steam may be introduced into furnace chamber 202 using steam supply valve 206. A flow of steam can be maintained by opening exhaust valve 210 and allowing steam to flow into the chamber 202 through steam supply valve 206. The amount of steam admitted to furnace chamber 202 may be sufficient to maintain a positive pressure in furnace chamber 202.

Once the steam has been introduced, the temperature in furnace chamber 202 may be raised to a second temperature and maintained for a second predetermined period of time. The second temperature may be within a range of about 460° C. to about 500° C. In one exemplary aspect, the second temperature may be about 482° C. The second predetermined period of time may be between about 10 to 30 minutes. In one exemplary aspect, the second predetermined amount of time may be about 20 minutes.

Next, exhaust valve 210 may be closed to maintain a steam environment in furnace chamber 202, but without a continuously flowing supply of steam (e.g., steam supply valve 206 may remain open while exhaust valve 210 is closed). The steam may be held in furnace chamber 202 for a third predetermined period of time. The third predetermined period of time may be between about 15 to 45 minutes, and in one exemplary aspect, may be about 30 minutes.

The temperature in furnace chamber 202 may then be raised to a third temperature and maintained for a fourth predetermined period of time. The third temperature may be within a range of about 570° C. to about 610° C. and in one exemplary aspect, may be about 593° C. The fourth predetermined period of time may be between about 30 minutes to 1 hour, and in one exemplary aspect may be about 45 minutes.

Then, the temperature in furnace chamber 202 may be reduced to a fourth temperature, steam supply valve 206 may be closed, and exhaust valve 210 may be opened to allow excess steam to escape. The fourth temperature may be within a range of about 350° C. to about 390° C., and in one exemplary aspect may be about 371° C.

This disclosed steam oxidation process may form an oxide layer on the surface of the cast iron component. Depending on the settings, such as steam flow rate, temperature and the like, the oxide layer can be created with varying depths or thickness. In one aspect, the oxide layer may have a thickness of more than 7 microns. In another aspect, the oxide layer may have a thickness of between about 8 microns and about 11 microns. In still another aspect, the oxide layer may have a thickness of between about 9 microns and about 10 microns. Further, the steam oxidation process can be automated so that the temperature controller 208, steam supply valve 206, exhaust valve 210 and the time of exposure can be regulated via a software and controller such as a computer.

Figure 4:
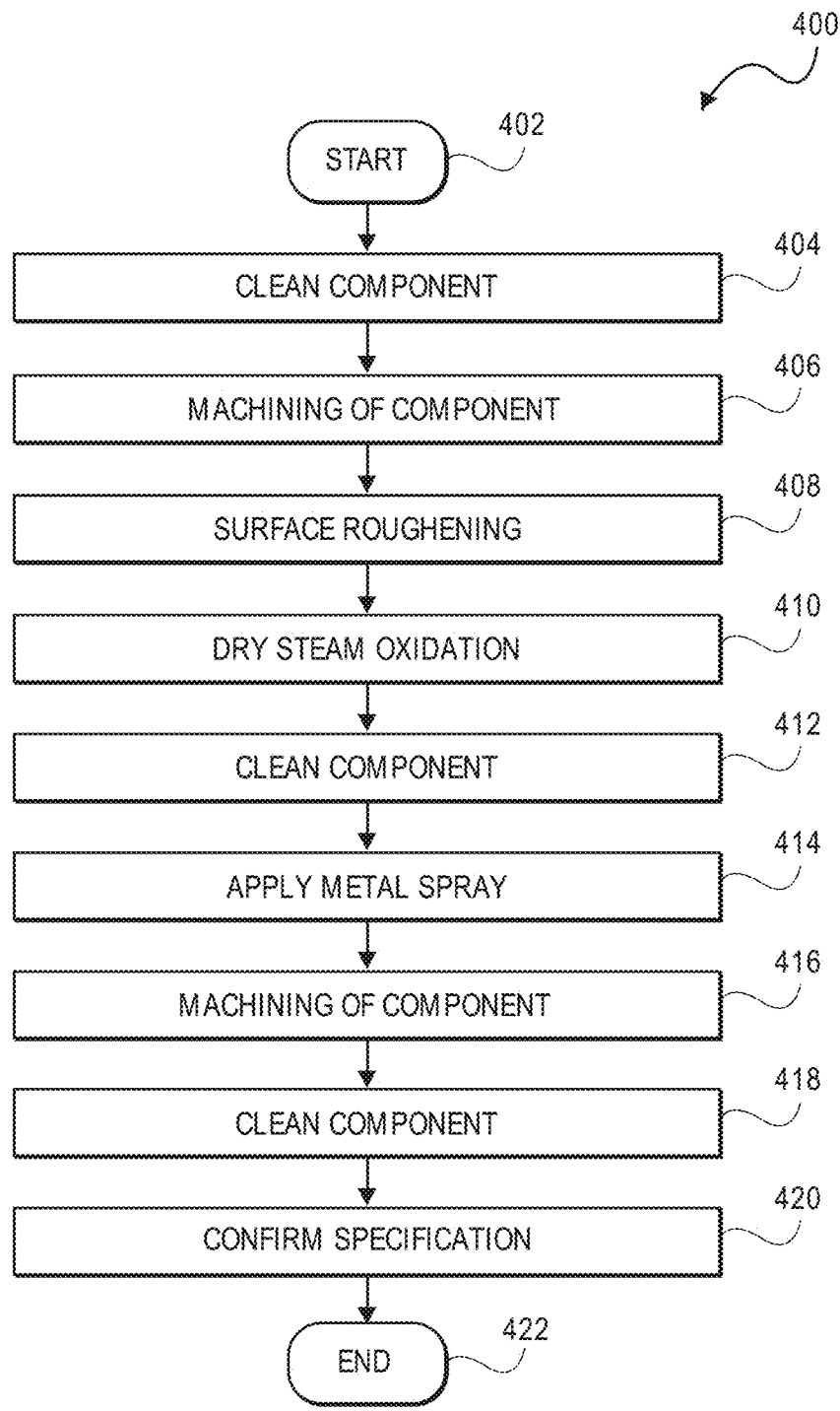
FIG. 4 illustrates a remanufacturing process using a steam oxidation process according to an aspect of the disclosure.

FIG. 4 illustrates the remanufacturing process 400 according to an aspect of the disclosure. The process 400 starts at step 402. At step 404, the component such as the attachment flange 116 is cleaned to remove any materials such as rust, oil, contaminants by using heat, sodium hydroxide, degreaser, alcohol and the like. At step 406, the initial machining of the component is conducted to remove major defects in the attachment flange 116, such as scars, nicks, gouges and the like. At step 408, further surface roughening or the machining can also be used to roughen or create a desired tortuous topography for the application of the thermal spray coating. The machining can be done with carbide inserts such as inserts DNMG 150404-PM 4225 or DNMG 431-PM 4225 from SANDVIK COROMANT or other surface roughening that includes mechanical (grit blasting, rough machining) and chemical processes.

At step 410, the above-described steam oxidation process can be utilized to form the desired oxide layer onto which the spray coating can be applied. At step 412, alternatively or in addition to a second cleaning of the component, such as light sanding, polishing and the like can be performed to remove any additional materials that may have flaked off during the machining step or any previous steps. At step 414, apply thermal metal spray coating to the attachment flange 116. Any type of thermal metal spray coating process can be used such as combustion flame spraying, high velocity oxy-fuel spraying (HVOF), two-wire electric arc spraying, plasma spraying, or vacuum plasma spraying and the like. Further, in one aspect of the disclosure more than one of the thermal metal spray processes may be used in conjunction with each other depending on the conditions of the attachment flange 116. In combustion flame spraying, the flame is propelled by oxygen mixed with fuel, which also results in melting the metal mixture. The combustion flame spraying uses powder or wire as the main coating mixture component. HVOF is similar to combustion flame spraying, but uses a different torch design that enables the flame to expand when the spray nozzle is engaged. This causes a surge in acceleration, and when the mixture is released from the nozzle, the velocity of the mixture leads to an evenly thin coat. In two-wire electric arc spraying, the deposition relies on an arc-point formed by two electrically conductive wires. Where the wires meet, melting occurs. In plasma spraying, a plasma torch is the primary source of heating and applying the coating. Once the powdered material has been melted, it is subsequently applied to the product in a similar manner as combustion flame spraying. Vacuum plasma spraying is a low temperature method that must be conducted inside a controlled environment, which not only sustains the vacuum but also helps minimize damage to the material. Because the vacuum environment is controlled, it helps ensure a more precise application of the material. Any material that is wear resistant and having high hardness can be thermally sprayed including nickel, nickel based alloys (NiAl, NiCr), stainless steel, Molybdenum MCrAlY's (NiCrAY, CoCrAY, NiCoCrAY, CoNiCrAY), Titanium (Ti), Stellite, Triballoy and the like. In other aspects of the disclosure, ceramics may be alternatively used.

At step 416, in addition to or alternatively, a final machining of the component or the attachment flange 116 is conducted to ensure that the flange is returned to the original manufacturer's specifications. The final machining can be done using any known method including sanding, milling and the like. At step 418, the component or the attachment flange 116 is cleaned and polished to remove any residual sprayed materials or from the final machining step. At step 420, confirm that the component or the attachment flange 116 meets or exceeds the original manufacturer's specification so that it can then be ready to be used in the turbochargers. At step 422, the process ends.

The process described above can be used with any component in any vehicle, device, apparatus and the like that can be remanufactured. These components, such as exhaust manifolds and turbochargers and the like, typically will have a thermal spray coating that are subjected to thermally cycling or high heat. Further, the steps in the process do not all have to be performed or performed in any particular order. Some of the steps can be performed at the same time or be combined.

INDUSTRIAL APPLICABILITY

A process of remanufacturing a component that includes a thermal spray coating, such as an attachment flange of turbochargers is provided. Portions of the attachment flange such as the sealing surface will wear out during use (thermal cycling and high heat) and needs to be returned to the original manufacturer's specifications. The sealing surface provides a connection of the turbocharger to a part of the engine. A steam oxidation process can be performed before applying a thermal spray coating in order to form a controlled oxide layer onto which the spray coating is applied. Any type of thermal spray metal techniques can be used such as combustion flame spraying, high velocity oxy-fuel spraying (HVOF), two-wire electric arc spraying, plasma spraying, and vacuum plasma spraying and the like. The controlled oxide layer allows for better adhesion of the thermal spray coating so that spalling is reduced or prevented Once the thermal metal spray is applied, additional cleaning and machining can be done to return the attachment flange to its original manufacturer's specification and for later use in repairs to the turbochargers.

We claim:

1. A method of remanufacturing a component of a turbocharger, comprising the steps of:
cleaning the component for a first time;
machining the component for a first time;
applying a steam oxidation process in a furnace to form an iron oxide layer on a sealing surface of the component;
applying a thermal metal spray coating on the component; and
machining the component for a second time.

2. The method of claim 1 further comprising the step of cleaning the component for a second time.

3. The method of claim 1 further comprising the step of confirming that the component is within a manufacturer's original specifications.

4. The method of claim 1, wherein the thermal metal spray coating is one of the following:
a combustion flame spraying, a high velocity oxy-fuel spraying (HVOF), a two-wire electric arc spraying, a plasma spraying, or a vacuum plasma spraying and the like.

5. The method of claim 1, wherein the thermal metal spray coating is applied on top of the iron oxide layer of the sealing surface.

6. The method of claim 1, wherein the component is an attachment flange of a turbocharger.

7. The method of claim 1, wherein the steam oxidation process comprises:
placing the component in the furnace;
raising a temperature in the furnace to a first temperature for a first period of time;
introducing steam into the furnace;
raising the temperature of the furnace to a second temperature for a second period of time;
maintaining the steam in the furnace, in a substantially non-flowing state, for a third period of time; and
reducing the temperature in the furnace to a third temperature.

8. The method of claim 7, wherein the iron oxide layer forms an adhesion layer for the thermal metal spray coating.

9. The method of claim 1, wherein the component is made from cast iron.

10. The method of claim 1, wherein machining the component for the first time creates tortuous surfaces on the sealing surface of the component.

11. A method of remanufacturing a component of a turbocharger, comprising the steps of:
cleaning the component for a first time;
machining the component for a first time to create a tortuous surface on a sealing surface of the component;
applying a steam oxidation process in a furnace to form an iron oxide layer on the sealing surface of the component;
applying a thermal metal spray coating on top of the sealing surface of the component;
machining the component for a second time; and
cleaning the component for a second time.

12. The method of claim 11 further comprising the step of cleaning the component for a third time.

13. The method of claim 11 further comprising the step of confirming that the component is within a manufacturer's original specifications.

14. The method of claim 11, wherein the thermal metal spray coating is one of the following:
a combustion flame spraying, a high velocity oxy-fuel spraying (HVOF), a two-wire electric arc spraying, a plasma spraying, or a vacuum plasma spraying and the like.

15. The method of claim 11, wherein the steam oxidation process comprises:
placing the component in the furnace;
time;
raising a temperature in the furnace to a first temperature for a first period of time;
introducing steam into the furnace;
raising the temperature of the furnace to a second temperature for a second period of maintaining the steam in the furnace, in a substantially non-flowing state, for a third period of time; and
reducing the temperature in the furnace to a third temperature.

16. The method of claim 15, wherein the iron oxide layer's thickness is controlled through the raising, introducing, maintaining steps.

17. The method of claim 11, wherein the component is an attachment flange of a turbocharger.

18. The method of claim 11, wherein the component is made from cast iron.

19. The method of claim 11, wherein the iron oxide layer forms an adhesion layer for the thermal metal spray coating.

20. The method of claim 11, wherein the component is a component of a turbocharger.

* * * * *